Patented May 11, 1954

2,678,282

UNITED STATES PATENT OFFICE 2,678,282

PROCESS FOR MANUFACTURING SYNTHETIC INORGANIC SILICATES OR THE LIKE

Clifford Jones, Eccleston, St. Helens, England, assignor to Pilkington Brothers Limited, Lancashire, England, a British company No Drawing. Application June 1, 1950,
Serial No. 165,595

5 Claims. (Cl. 106—65)

This invention relates to the manufacture of a synthetic mullite.

Pure mullite is a very desirable refractory material because it consists of closely interlocking crystals which give it good mechanical strength, and because it contains no glassy matrix liable to drain out of the material in service as a result of its fusibility being lowered by external chemical attack.

By the calcination at high temperature, usually above 1400° C., of Kaolin ($Al_2O_3.2SiO_2.2H_2O$), or of Kyanite or sillimanite (which are two different crystalline forms of $Al_2O_3SiO_2$), or of other aluminium silicates, it is relatively easy to promote the growth of crystals of mullite, the formula of which is approximately $3Al_2O_3.2SiO_2$: but in the material so produced there is a residue of excess silica ($SiO_2$), usually in the form of a glassy matrix. This glassy matrix of silica is detrimental in refractories for tank-furnaces used for the melting of glass from the raw ingredients because, in the conditions existing in such furnaces, it is liable to be attacked by alkaline dusts and furnace gases as a result of which its fusibility is lowered and it drains out of the refractory material leaving an open porous structure which may disintegrate in service.

Thus, if a mullite refractory can be made in which there is no glassy matrix that can cause weakness by draining out of the structure in the presence of alkaline dusts, etc., full advantage can be taken of the characteristically good mechanical and chemical properties of pure mullite as a refractory for high temperature service.

Attempts to make an all-mullite refractory by introducing the correct quantity of alumina ($Al_2O_3$) to combine with this excess silica usually result in a mixture of mullite, corundum (a particular crystalline form of $Al_2O_3$); and silica. For example, we have found that the calcination of a mixture of crushed sillimanite (natural rock) and alumina in the proportions present in mullite results in a material containing mullite and corundum.

A. J. Bradley and A. L. Roussin (cf. Transactions of the Ceramic Society, (1932), 31, 422), have described mixtures of porcelains which on X-ray examination gave spectra similar to but not identical with that of mullite, and they suggested that the material should be called "Porzite."

H. P. Rooksby and J. H. Partridge, (cf. Journal of the Society of Glass Technology, (1939), 23, 338), have described results of the X-ray examination of the structures of artificial and natural mullite and sillimanite. They discounted the suggestion of Bradley and Roussin that their "Porzite" was a new aluminium silicate, and they identified three forms of mullite, viz:

1. $\alpha$ mullite.—This contains 72% of $Al_2O_3$ and 28% of $SiO_2$ by weight: its formula is $$3Al_2O_3.2SiO_2$$

This form was not identified in any of the natural samples, but it was prepared synthetically by grinding together pure silica ($SiO_2$) and pure alumina ($Al_2O_3$) in the correct proportions, and calcining the mixture at 1750°. There is no disclosure of the material being moulded into shaped articles.

2. $\beta$ mullite.—This contains 72% to 78% of $Al_2O_3$ and 28% to 22% of $SiO_2$ by weight: its formula is approximately $3Al_2O_3.2SiO_2$.

The X-ray spectrum for this material was found to correspond to that found for mullite crystals in electrically fused (electro-cast) tank-furnace blocks, and to that for natural mullite from North America. A substance very similar crystallographically was prepared artificially by mixing pure silica ($SiO_2$) with pure alumina ($Al_2O_3$) in excess of the 72 to 28 alumina-to-silica ratio and calcining the mixture at 1800°.

3. $\gamma$ mullite.—This was found in samples of natural material from the Isle of Mull (hence the name "mullite"). A material very similar to it was prepared by repeating the process described in 1. above for the synthesis of $\alpha$ mullite, but replacing 1% of the alumina ($Al_2O_3$) by 1% of titania ($TiO_2$) or by less than 1% of ferric oxide ($Fe_2O_3$).

Accordingly, the present invention provides a process for the manufacture of synthetic mullite wherein an intimate mixture of alumina and aluminium silicate bonded by means of an ethyl silicate is calcined at a temperature of at least 1500° C., the proportions of the ingredients being such that the ratio of alumina to silica in the calcined mixture is between 72% and 78% by weight of $Al_2O_3$ and between 28% and 22% by weight of $SiO_2$.

The calcination temperature should be at least 1500°, but a higher temperature, e. g. of 1650 to 1700° C. may be attained when it is required to produce a very dense material.

The aluminium silicate (such as Kyanite or sillimanite) should be of high purity and both the aluminium silicate and the alumina must be finely ground (i. e. must pass through a 200 mesh sieve or finer).

Preferably, the binding agent is an ethyl silicate or mixture of ethyl silicates, such as the material sold as silicon ester and usually containing 40 to 47% by weight of silica ($SiO_2$). The silicon ester may conveniently be used in solution in water or as a dispersion in an alcohol-water mixture, and the quantity of silicon ester thus introduced into the mixture can be adjusted according to the consistency required for consolidating the final mix, as little as 1% by weight of the dry mixture may be appropriate in some cases, and experiments have shown that a quantity of 5% by weight of the dry mixture has produced very efficient results.

The ingredients should be very thoroughly mixed. When the silicon ester breaks down, the pure silica produced is in a very finely divided state and is more reactive than ordinary fine-ground silica. Since this silica is introduced as a solution or dispersion it may be assumed to be very uniformly distributed.

The following example illustrates how the process of the invention may be carried into effect:

500 gms. of a natural rock sillimanite containing 58% (=290 gms.) of $Al_2O_3$ and 39% (=195 gms.) of $SiO_2$ crushed to 200-mesh were intimately mixed with 500 gms. of calcined alumina, $Al_2O_3$, crushed to 200-mesh and 247 c. c. of silicon ester (containing 46.5% by weight of silica equivalent to 112 gms. of $SiO_2$) in an alcohol-water solution consisting of 60 c. c. of alcohol and 27 c. c. of water. Thus the ratio of total alumina to total silica in the mixture was 72 to 28. The mixture, after shaping with a required article, was calcined at between 1650° C. and 1700° C. by heating in a gas-air fired furnace. The product was a synthetic αmullite.

By slightly increasing the ratio of alumina to silica βmullite may be prepared in a similar manner.

In the manufacture of refractories intended for use in the making of glass, experience has shown that the aluminium compound herein described should be calcined at a temperature of at least 1500° C.

The mixture is eminently suitable for pressing, hammering, jolting or slip-casting to the required shape before calcining. The moisture content appropriate to the shaping process used is obtained by adjustment of the quantity of water in the mixture and by allowing the mixture to dry out if necessary—it hardens fairly quickly in warm air.

The porosity of the material produced can be reduced by crushing after calcining, then re-bonding with an organic binder such as polyvinyl alcohol, and shaping and recalcining.

A synthetic mullite manufactured according to the present invention may be used as a bonding material for certain other refractories, for example corundum, but not with materials such as zirconium with which the mullite would react to lower the melting point of the mixture.

I claim:

1. A process for the manufacture of a synthetic substitute for natural mullite which comprises calcining an intimate mixture of alumina, aluminium silicate and ethyl silicate as a binding agent, at a temperature of between 1500° C. and 1800° C., the initial proportions of the ingredients being such that in the calcined mixture the ratio of alumina to silica is between 72% and 78% by weight of $Al_2O_3$ and between 28% and 22% by weight of $SiO_2$.

2. A process for the manufacture of a synthetic substitute for natural mullite which comprises calcining an intimate mixture of alumina, aluminium silicate and an ethyl silicate containing between 40% and 47% by weight of $SiO_2$ as a binding agent, at a temperature of between 1500° C. and 1800° C., the initial proportions of the ingredients being such that in the calcined mixture the ratio of alumina to silica is between 72% and 78% by weight of $Al_2O_3$ and between 28% and 22% by weight of $SiO_2$.

3. A process for the manufacture of a synthetic substitute for natural mullite which comprises calcining an intimate mixture of alumina, aluminium silicate and an ethyl silicate as a binding agent, at a temperature of between 1650° and 1700° C., the initial proportions of the ingredients being such that in the calcined mixture the ratio of alumina to silica is between 72% and 78% by weight of $Al_2O_3$ and between 28% and 22% by weight of $SiO_2$.

4. A process for the manufacture of a synthetic substitute for natural mullite which comprises intimately mixing together alumina, aluminium silicate and an aqueous alcoholic solution of an ethyl silicate, calcining the mixture thus produced at a temperature of between 1500° C. and 1800° C., the initial proportions of the ingredients being such that in the calcined mixture the ratio of alumina to silica is between 72% and 78% by weight of $Al_2O_3$ and between 28% and 22% by weight al $SiO_2$.

5. A process for the manufacture of a synthetic substitute for natural mullite which comprises intimately mixing together alumina, sillimanite and an aqueous alcoholic solution of an ethyl silicate, calcining the mixture thus produced at a temperature of between 1650° and 1700 C., the initial proportions of the ingredients being such that in the calcined mixture the ratio of alumina to silica is between 72% and 78% by weight of $Al_2O_3$ and between 28% and 22% by weight of $SiO_2$.

References Cited in the file of this patent

UNITED STATES PATENTS

| Number | Name | Date |
|---|---|---|
| 2,450,327 | Cogan et al. | Sept. 28, 1948 |

FOREIGN PATENTS

| Number | Country | Date |
|---|---|---|
| 957,817 | France | 1949 |
| 242,455 | Germany | 1912 |